United States Patent [19]

Muraki et al.

[11] Patent Number: 5,740,451
[45] Date of Patent: Apr. 14, 1998

[54] MICROCOMPUTER HAVING FUNCTION OF MEASURING MAXIMUM INTERRUPT-DISABLED TIME PERIOD

[75] Inventors: Hiroyuki Muraki; Akiya Fukui, both of Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 736,142

[22] Filed: Oct. 28, 1996

[30] Foreign Application Priority Data

May 16, 1996 [JP] Japan .................................. 8-121737

[51] Int. Cl.⁶ .............................. G06F 9/46; G06F 13/14
[52] U.S. Cl. ............................ 395/733; 395/735; 395/869
[58] Field of Search ............................ 395/733, 735, 395/869, 653

[56] References Cited

U.S. PATENT DOCUMENTS

| | | | |
|---|---|---|---|
| 4,099,255 | 7/1978 | Stanley et al. | 395/735 |
| 5,146,598 | 9/1992 | Takezawa | 395/733 |
| 5,539,729 | 7/1996 | Bodnar | 370/232 |
| 5,542,076 | 7/1996 | Benson et al. | 395/733 |
| 5,588,125 | 12/1996 | Bennett | 395/306 |

FOREIGN PATENT DOCUMENTS

| | | |
|---|---|---|
| 50-142134 | 11/1975 | Japan . |
| 3288943 | 12/1991 | Japan . |
| 474231 | 3/1992 | Japan . |

Primary Examiner—Gopal C. Ray
Attorney, Agent, or Firm—Leydig, Voit & Mayer, Ltd.

[57] ABSTRACT

A microcomputer comprises a timer controller for detecting a time when a disabled state in which interrupts are disabled starts and a time when the disabled state ends, a count timer which starts a counting operation when the timer controller detects a time when the disabled state starts, for measuring a period of time during which interrupts are disabled, and a comparator which receives a current count value of the count timer when the disabled state ends, and, when determining that the current count value is larger than a maximum of count values previously received which is stored in a register for storing a maximum of interrupt-disabled time periods, stores the current count value in the register.

6 Claims, 6 Drawing Sheets

MICROCOMPUTER HAVING FUNCTION OF MEASURING MAXIMUM INTERRUPT-DISABLED TIME PERIOD

BACKGROUND OF THE INVENTION

1. Field of the Invention

The present invention relates to a microcomputer having a function of disabling interrupts, and a function of measuring a maximum of periods of time during which interrupts are disabled, including a function of making the user able to easily recognize the maximum interrupt-disabled time period.

2. Description of the Prior Art

Development of a program to be loaded into a microcomputer often needs measurements of periods of time during which interrupts are disabled in the program. Especially, it frequently needs determination of whether or not a maximum of lengths of periods of time which interrupts are disabled exceeds its acceptable range.

Figure 7:
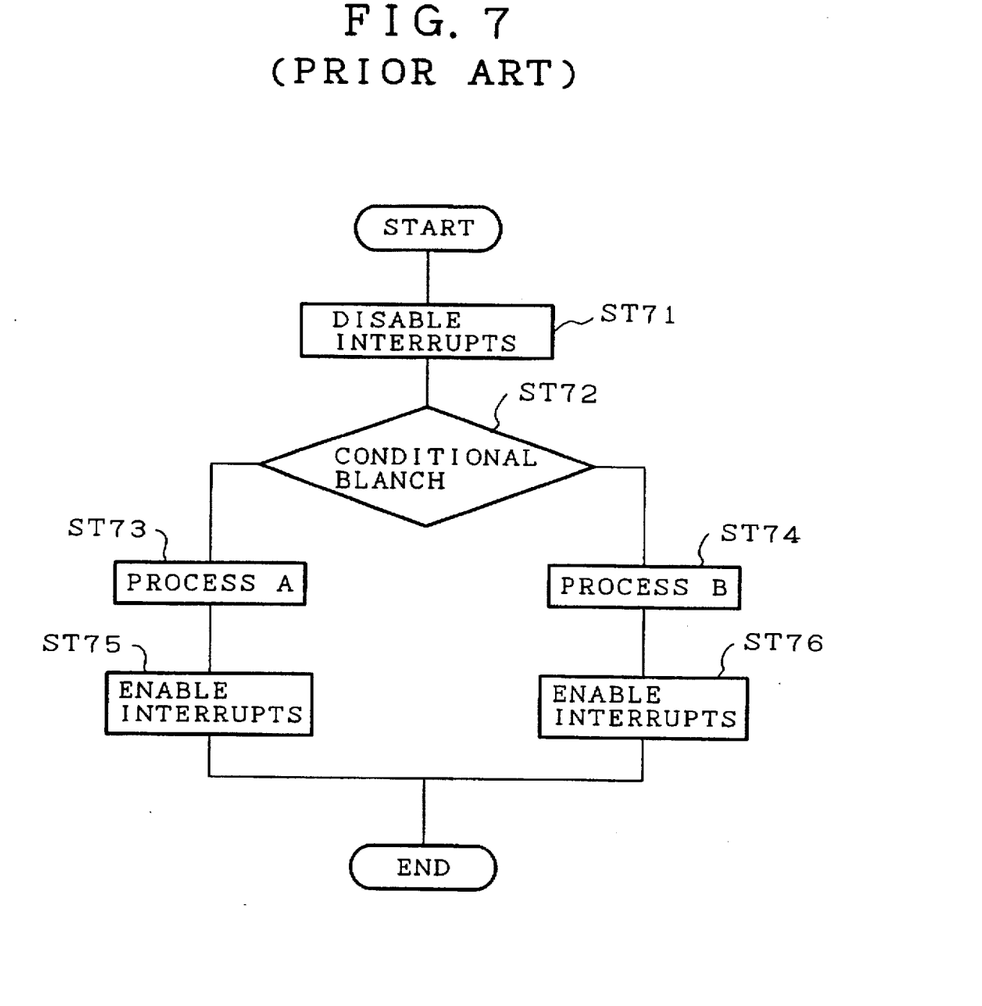
FIG. 7 is a flow diagram of an example of a prior art program.

Referring now to FIG. 7, it illustrates a flow diagram of an example of conventional programs. Now, think of a case of measuring a period of time during which the program changes from a state wherein interrupts are disabled in step ST71 to a state wherein interrupts are enabled in step ST75 by way of a conditional branch step in step ST72 and a process A in step ST73.

A method of measuring time utilizes an emulator apparatus used for development of a program. When using such a method, after the user presets a brake condition to stop the program at step ST75 and a condition to cause the program to branch to the process A in step ST72 into the emulator apparatus, he or she starts the program. When the program meets the brake condition, that is, it reaches the step ST75, it is stopped. In general, such the emulator apparatus has a function of measuring a period of time between the instance when a program is started and the instance when the program is stopped. Therefore, the user can know the length of a period of time during which interrupts are disabled from the program running time period displayed on the emulator apparatus.

Another method of measuring time utilizes a logic analyzer used for development of a program. When using such a method, after the user presets address data corresponding to step ST71 as a start trigger condition into the logic analyzer having a probe connected to a bus of a microcomputer into which the program is loaded, he or she starts the program. When the program meets the start trigger condition, that is, it reaches the step ST71, the logic analyzer starts to carry out a sweep process. The user can read a period of time between the instance when the sweep process is started and the instance when an address corresponding to step ST75 is displayed on the screen of the logic analyzer. The user thus can know the length of a period of time during which interrupts are disabled.

Furthermore, the methods mentioned above can measure a period of time during which the program shown in FIG. 7 changes from a state wherein interrupts are disabled in step ST71 to a state wherein interrupts are enabled in step ST76 by way of a conditional branch step in step ST72 and a process B in step ST74. The maximum interrupt-disabled time period for the program shown in FIG. 7 is a longer one among the two measured time periods during which interrupts are disabled.

In general, when developing a large-scale program, the user measures the lengths of time periods during which interrupts are disabled for many paths in the program and assumes that the maximum of the measured lengths is the maximum interrupt-disabled time period.

In accordance with the methods mentioned above, the user has to recognize all paths in the program, each including a step wherein interrupts are disabled and a step wherein interrupts are enabled. However, it is difficult to recognize all the paths in a large-scale, complicated program.

Figure 8:
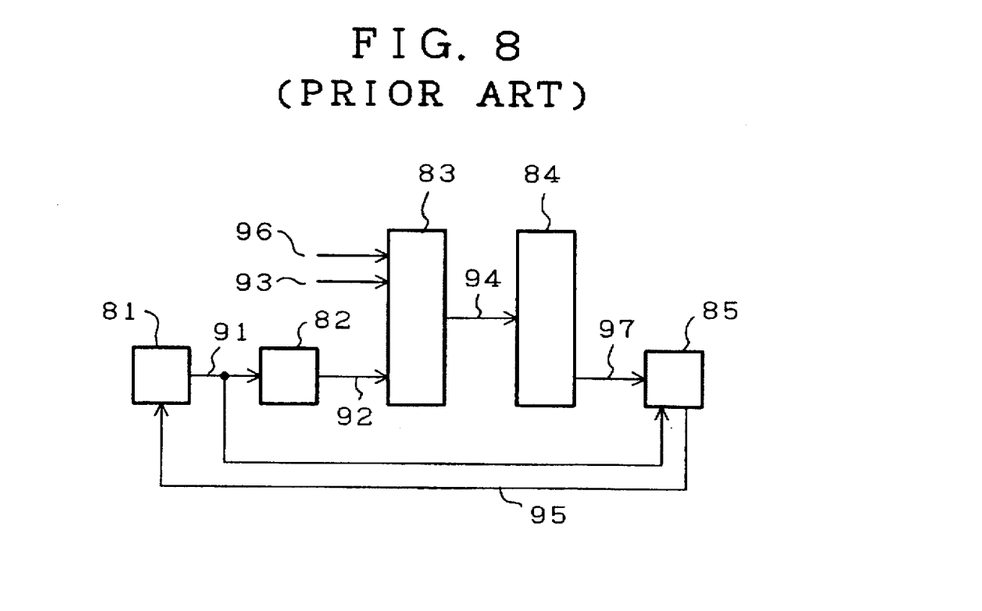
FIG. 8 is a block diagram of a prior art system of monitoring a period of time during which interrupts are disabled.
Figure 9:
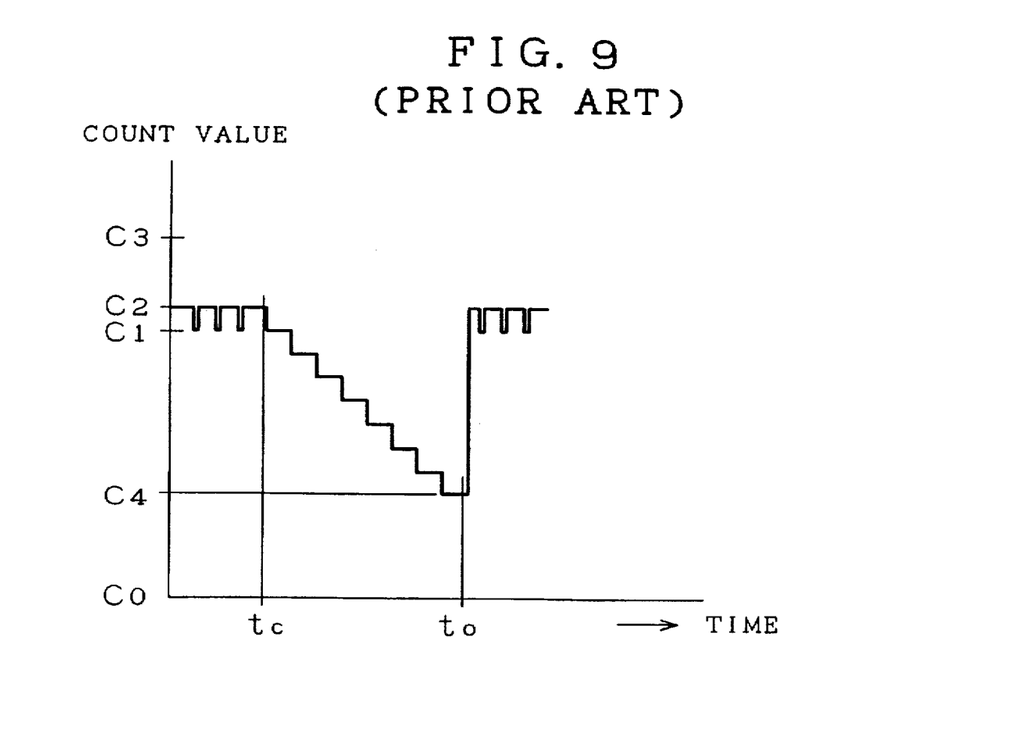
FIG. 9 is a timing chart of the prior art system of monitoring a period of time during which interrupts are disabled.

Referring now to FIGS. 8 and 9, they respectively show a block diagram and a timing chart showing a prior art system for monitoring a period of time during which interrupts are disabled as disclosed in Japanese Application Laid Open (KOKAI) No. 50-142134. In FIG. 8, reference numeral 81 denotes a counter, 82 denotes a timer-interrupt request generating circuit for generating an interrupt request signal 92 when a count value 91 by the counter 81 reaches a predetermined value C1, 83 denotes an interrupt circuit which receives the interrupt request signal 92, an interrupt request signal 93, and a signal 96 for disabling interrupts, for outputting an interrupt signal in accordance with these signals, 84 denotes an interrupt-request-signal analyzing circuit for analyzing the interrupt request signals 92 and 93, and 85 denotes a timer-interrupt circuit which receives a timer-interrupt signal 97 from the interrupt-request-signal analyzing circuit 84, for outputting a preset value 95 to the counter 81.

Next, a description will be made as to the operation. When the interrupt circuit 83 receives the interrupt request signal 92 from the timer-interrupt request signal generating circuit 82 during the interrupt disabling signal 96 is not active, it outputs the interrupt signal 94 to the interrupt-request-signal analyzing circuit 84. When the interrupt-request-signal analyzing circuit 84 determines that the cause of the interrupt signal 94 is a timer interrupt, it outputs the timer-interrupt signal 97 to the timer-interrupt circuit 85. When the timer-interrupt circuit 85 receives the timer-interrupt signal 97, it reads the count value 91 by the counter 81 and outputs the preset value 95 to the counter 81. The preset Value 95 is larger than the predetermined value C1. Hereinafter, C2 refers to the preset value 95.

When the interrupt disabling signal 96 is not active, the timer-interrupt signal 97 is generated just after the interrupt request signal 92 is generated. Thus, the count value 91 which are read by the timer-interrupt circuit 85 is equal to the predetermined value C1. On the contrary, when the interrupt disabling signal 96 is active, the interrupt circuit 83 does not generate the interrupt signal 94 even though the interrupt request signal 92 is delivered thereto. In this case, when the interrupt disabling signal 96 changes to a nonactive state, the interrupt circuit 83 generates the interrupt signal 94. The counter 81 continues to count until the interrupt disabling signal 96 changes to a nonactive state. In such a case, the count value 91 of the counter 81 is varied when the timer-interrupt circuit 85 receives the timer-interrupt signal 97. FIG. 9 shows that the interrupt disabling signal 96 changes to an active state at a time $t_c$ and changes to a nonactive state at a time $t_o$. In this case, the count value 91 of the counter 81 read by the timer-interrupt circuit 85 at the time $t_o$ is C4.

When the timer-interrupt circuit 85 reads the count value 91 from the counter 81, it compares a value stored to (the count value—C1). The value of (the count value—C1) corresponds to a period of time during which interrupts are disabled. If the value corresponding to an interrupt-disabled time period exceeds the stored value, the stored value is replaced by the value of (the count value—C1) corresponding to an interrupt-disabled time period. After the program is executed for some time, the value stored is read out. The stored value corresponds to the maximum of interrupt-disabled time periods within a period of time during which the program is running. Thus, the user can recognize the maximum interrupt-disabled time period. It should be noted that Japanese Application Laid Open (KOKAI) NO. 50-142134 does not show that the method disclosed in the reference can be applied to a microcomputer. However, the method is applicable to a microcomputer.

Since a prior art system of measuring a maximum of periods of time which interrupts are disabled is so constructed as mentioned above, an interrupt process is activated every time the count value 91 of the counter 81 reaches the predetermined value C1 in order to measure a period of time during which interrupts are disabled. Therefore, the user's program is interrupted at very close intervals by the interrupt processes. Thus, the conventional method makes the running time of the user's program longer when measuring the maximum interrupt-disabled time period. Accordingly, there may be cases where the user's program is not executed properly. This results in hindering the measurement of the maximum of periods of time during which interrupts are disabled.

SUMMARY OF THE INVENTION

The present invention is made in order to overcome the above problem. More precisely, an object of the present invention is to provide a microcomputer having a function of measuring a maximum of periods of time during which interrupts are disabled, by which a period of time during which interrupts are disabled can be measured in the same environment as a real running environment in which a user's program is running. The real running environment refers to an environment in which the user's program is not being debugged and tested, that is, a situation in which the program is used for its intended purpose.

In accordance with the present invention, there is provided a microcomputer having a function of measuring a maximum of periods of time during which interrupts are disabled, the microcomputer comprising: a memory unit for storing a value indicating a maximum interrupt-disabled time period in a program; a disabled-state detecting unit for detecting a time when a disabled state in which interrupts are disabled starts in the program and a time when the disabled state ends; a counter unit which starts a counting operation when the disabled-state detecting unit detects a time when the disabled state starts; and a comparing unit which receives a count value of the counter unit when the disabled-state detecting unit detects a time when the disabled state ends, and updates contents of the memory unit by replacing the value in the memory unit with the count value when the comparing unit determines that the count value is larger than the value in the memory unit.

In accordance with a preferred embodiment of the present invention, the disabled-state detecting unit comprises an interrupt disable flag detecting unit for detecting a state of an interrupt disable flag in a CPU which is set to disable interrupts. Furthermore, the disabled-state detecting unit detects a start of a disabled state in which interrupts are disabled through detection of a transition of the interrupt disable flag to a state indicating that interrupts are disabled by the interrupt disable flag detecting unit, and detects an end of the disabled state through detection of a transition of the interrupt disable flag to a state indicating that interrupts are enabled by the interrupt disable flag detecting unit.

In accordance with a preferred embodiment of the present invention, the disabled-state detecting unit comprises an interrupt disable level determining unit for determining whether or not an interrupt disable level in a CPU defining interrupt priorities of interrupts which are to be disabled is equal to or larger than a predetermined value. Furthermore, the disabled-state detecting unit detects a start of a disabled state in which interrupts are disabled from a fact that the interrupt disable flag detecting unit determines that the interrupt disable level is equal to or larger than the predetermined value, and detects an end of the disabled state from a fact that the interrupt disable flag detecting unit determines that the interrupt disable level is smaller than the predetermined value.

Preferably, the counter unit is adapted to inform an occurrence of an overflow of a count value when the overflow occurs during a counting operation.

Preferably, the microcomputer comprises a register for storing a measurement start flag which is set to allow the disabled-state detecting unit to detect times when a disabled state in which interrupts are disabled starts and ends.

Further objects and advantages of the present invention will be apparent from the following description of the preferred embodiments of the invention as illustrated in the accompanying drawings.

DETAILED DESCRIPTION OF THE PREFERRED EMBODIMENTS

Next, a description will be made as to an embodiment of the present invention.

Figure 1:
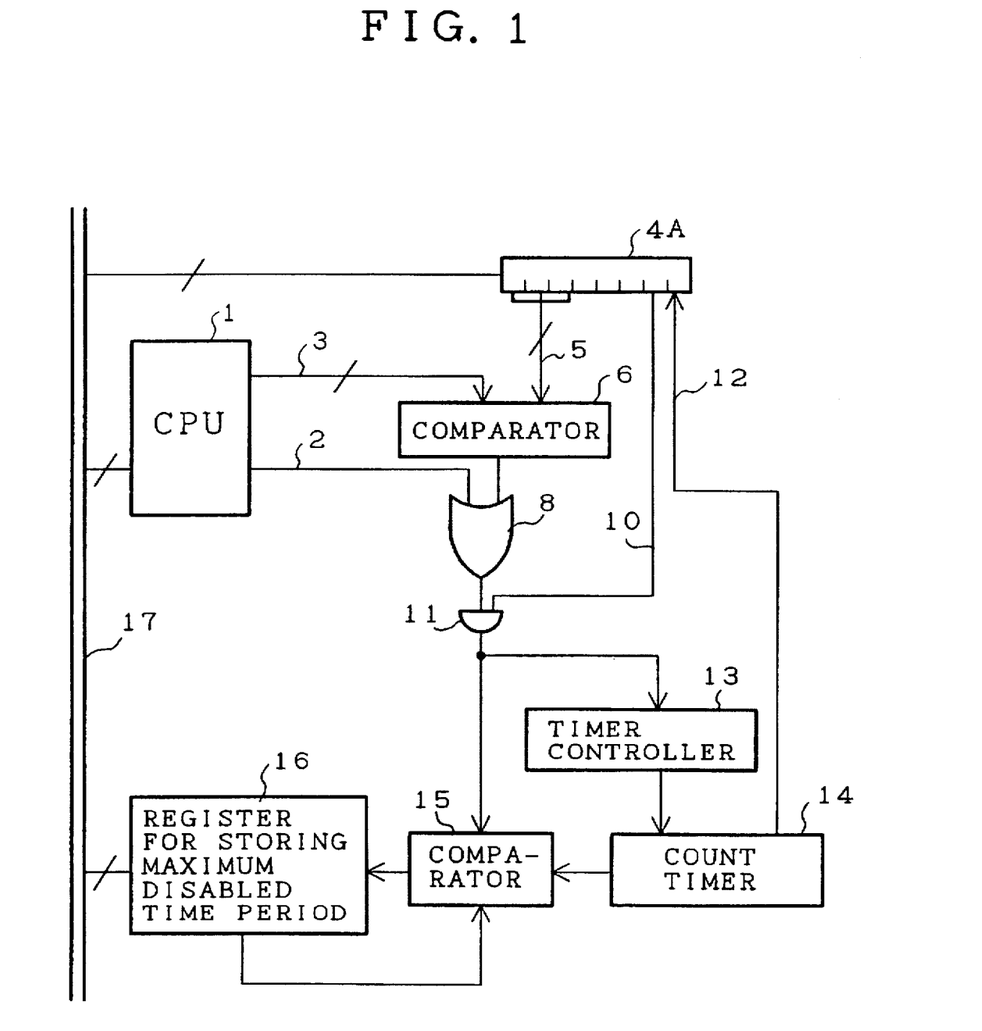
FIG. 1 is a block diagram showing main components of a microcomputer with a function of measuring a maximum of periods of time during which interrupts are disabled, according to a first embodiment of the present invention.

Referring now to FIG. 1, it illustrates a block diagram showing main components of a microcomputer with a function of measuring a maximum of periods of time during which interrupts are disabled, according to the first embodiment of the present invention. In the figure, reference numeral 1 denotes a CPU, 2 denotes an interrupt disable flag signal indicating the state of an interrupt disable flag which can be set to disable interrupts, 3 denotes an interrupt disable level signal indicating an interrupt disable level, 4A denotes a register used for measurement control, in which an interrupt disable measurement level, a measurement start flag, and a timer overflow flag can be set respectively, 5 denotes an interrupt disable measurement level signal indicating the interrupt disable measurement level, 6 denotes a comparator which compares the interrupt disable level signal 3 to the interrupt disable measurement level 5, 8 denotes an OR gate which performs an OR operation on the output of the comparator 6 and the interrupt disable flag signal 2, 11 denotes an AND gate which allows the output of the OR gate 8 to pass through the AND gate if a measurement start flag signal 10 indicating the state of the measurement start flag in the register 4A is active, 12 denotes a timer overflow signal which can set the timer overflow flag in the register 4A, 13 denotes a timer controller for controlling a count timer 14 for measuring a period of time during which interrupts are disabled, 15 denotes a comparator which compares a count value by the count timer 14 to the contents of a register 16 for storing a maximum of interrupt-disabled time periods measured, and 17 denotes a buss in the microcomputer.

Figure 2:
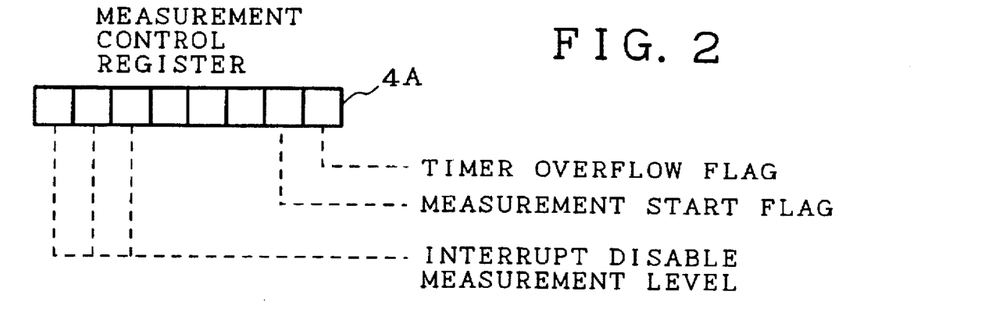
FIG. 2 is view showing an example of a register used for measurement control.

Referring now to FIG. 2, it illustrates an example of the register 4A used for measurement control. As shown in the figure, the measurement control register 4A includes a 3-bit area for the interrupt disable measurement level, the measurement start and timer overflow flags.

Figure 3:
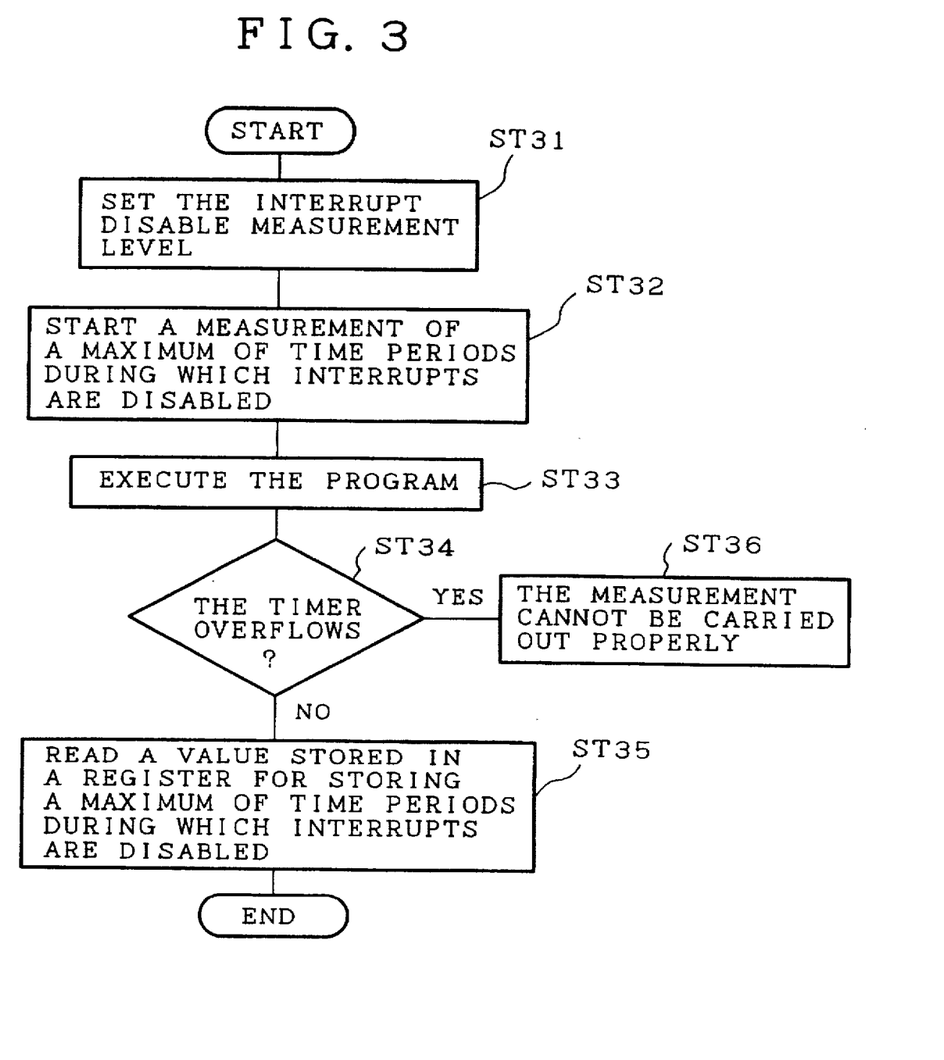
FIG. 3 is a flow diagram showing a process of measuring the maximum of periods of time during which interrupts are disabled, according to the first embodiment of the present invention.

Next, a description will be made as to the operation of the microcomputer according to this embodiment by referring to the flowchart in FIG. 3. The microcomputer according to this embodiment is adapted to be able to handle a plurality of interrupts and assign an interrupt priority to each of the plurality interrupts. For example, the microcomputer can handle sixteen interrupts and assign one of eight varieties of priorities to each of the sixteen interrupts. A program can define the interrupt disable level. For example, when the interrupt disable level is set to "five" level, interrupts with interrupt priorities which are set to "five" level or lower are disabled. The interrupt disable level is stored in a register within the CPU 1. The microcomputer according to this embodiment has an interrupt disable instruction for disabling all interrupts which can be disabled and an interrupt enable instruction for cancelling the interrupt disable instruction. When the interrupt disable instruction is executed, the interrupt disable flag in the CPU 1 is set.

When a program is intended to disable interrupts with a certain interrupt priority, it executes the interrupt disable instruction or sets the interrupt disable level to a priority level which is equal to or higher than the above certain interrupt priority. When the interrupt disable level is set to a priority level which is equal to or higher than an interrupt priority, all interrupts with priorities which are equal to or lower than the set priority level are disabled. Therefore, in order to measure a period of time during which a certain interrupt is disabled, it is necessary to measure the length of a period of time during which the interrupt disable level is maintained at a level which is equal to or higher than the priority of the certain interrupt, or the length of a period of time during which the interrupt disable flag is set.

A description will be made as to the operation of the microcomputer in the case of measuring a period of time during which interrupts with an interrupt priority which is set to "five" level are disabled, as an example. In this case, the user who intends to measure a period of time during which such interrupts are disabled, in step ST31, sets the interrupt disable measurement level in the interrupt disable measurement level area of the measurement control register 4A to "five" level through an emulator apparatus or the like. Furthermore, the user, in step ST32, sets the measurement start flag in the measurement control register 4A, and after that starts a program in step ST33.

When the interrupt disable instruction is carried out during the program's execution, the CPU 1 sets the interrupt disable flag. Since the interrupt disable flag signal 2 reflects the state of the interrupt disable flag, the interrupt disable flag signal 2 makes a transition from its nonactive state to its active state. In this embodiment, the interrupt disable flag signal 2 makes a LOW to High transition. The active interrupt disable flag signal 2 passes through the OR gate 8 and further the AND gate 11 because the measurement start flag signal 10 remains asserted. As a result, an active signal appears on the output of the AND gate 11. When the output of the AND gate 11 makes to a transition from its nonactive state to its active state, the timer controller 13 resets the count timer 14 for measuring a period of time during which the certain interrupt is disabled. Then, the count timer 14 starts a counting operation from its initial value.

When the interrupt enable instruction is carried out during the program's execution, the CPU 1 resets the interrupt disable flag. As a result, the interrupt disable flag signal 2 makes a transition from its active state to its nonactive state. In this embodiment, the interrupt disable flag signal 2 makes a HIGH to LOW transition. Accordingly, a nonactive signal appears on the output of the AND gate 11. Then, when the output of the AND gate 11 makes to a transition from its active state to its nonactive state, the timer controller 13 stops the count timer 14.

The comparator 15 reads a current count value of the count timer 14 and a value stored in the register 16 for storing a maximum of disabled periods of time when the output of the AND gate 11 makes to a transition from its active state to its nonactive state. Then the comparator 15 compares them to each other. If the current count value of the count timer 14 is larger than the value stored in the register 16 for storing a maximum of disabled periods of time, the comparator stores the current count value into the register 16. When a overflow occurs in the count timer 14 carrying out a counting operation, the count timer 14 sets the overflow flag in the measurement control register 4A.

On the other hand, since the interrupt disable measurement level signal 5 at a "five" level is applied to the comparator 6, the comparator 6 outputs an active signal when the interrupt disable level signal 3 from the CPU 1 makes a transition to a state at the "five" level or a higher level. In this embodiment, the output of the comparator makes a LOW to HIGH transition. The CPU outputs the interrupt disable level signal 3 to define the interrupt disable level during the program's execution. Therefore, when the interrupt disable level is set to the "five" level or a higher level during the program's execution, the comparator 6 outputs an active signal. The active signal from the comparator 6 passes through the OR gate 8, and further the AND gate 11 because the measurement start flag signal 10 remains asserted. As a result, an active signal appears on the output of the AND gate 11. The timer controller 13 resets the count timer 14 when the output of the AND gate 11 makes a transition from its nonactive state to its active state. Then, the count timer 14 starts a counting operation from its initial value.

When the interrupt disable level is set to a level which is lower than the "five" level during the program's execution, the comparator 6 outputs a nonactive signal. In this embodiment, the output of the comparator 6 makes a HIGH to LOW transition. Accordingly, a nonactive signal appears on the output of the AND gate 11 if the active interrupt disable flag signal 2 is not delivered to the OR gate. Then, when the output of the AND gate 11 makes a transition from its active state to its nonactive state, the timer controller 13 stops the count timer 14. After that, the comparator 15 carries out a comparison as previously explained, and updates a value stored in the register 16 for storing a maximum of interrupt-disabled time periods, if necessary.

After the program has continued to run for some time, or it reaches a desired address, the user stops the program. Then, the user reads the contents of the measurement control register 4A through the emulator apparatus or the like. When the overflow flag is set in the measurement control register 4A, this shows that one or more overflows have occurred in the count timer 14 during the program's execution. Therefore, since one or more overflows in the count timer 14 mean that a precise count value could not be obtained, the user, in step ST34, recognizes that the count timer 14 has overflowed and after that determines that a precise measurement could not be carried out to obtain the maximum interrupt-disabled time period, in step ST36. However, the user can recognize that there exists at least a long interrupt-disabled time period which exceeds a maximum countable value of the count timer 14 even though the user cannot know the maximum interrupt-disabled time period.

On the other hand, when the user, in step ST34, recognizes that the count timer 14 has not overflowed, he or she, in step ST35, reads the contents of the register 16 for storing a maximum of interrupt-disabled time periods through the emulator apparatus or the like. The comparator 15 has already stored a count value corresponding to the maximum interrupt-disabled time period obtained during the program's execution into the register 16. Thus, the user can know the maximum interrupt-disabled time period from the value stored in the register 16, immediately.

As previously mentioned, according to the first embodiment, the user can easily know a maximum of periods of time during which interrupts are disabled by executing any arbitrary part of the program. Furthermore, since an arbitrary interrupt disable measurement level can be defined in the measurement control register 4A, a period of time during which interrupts with an arbitrary interrupt priority or lower are disabled can be measured. In addition, since the interrupt-disabled time period measurement can be turned on and off by the measurement start flag in the measurement control register 4A embedded in the microcomputer, the testing flexibility of a program using an emulator apparatus or the like can be improved.

Figure 4:
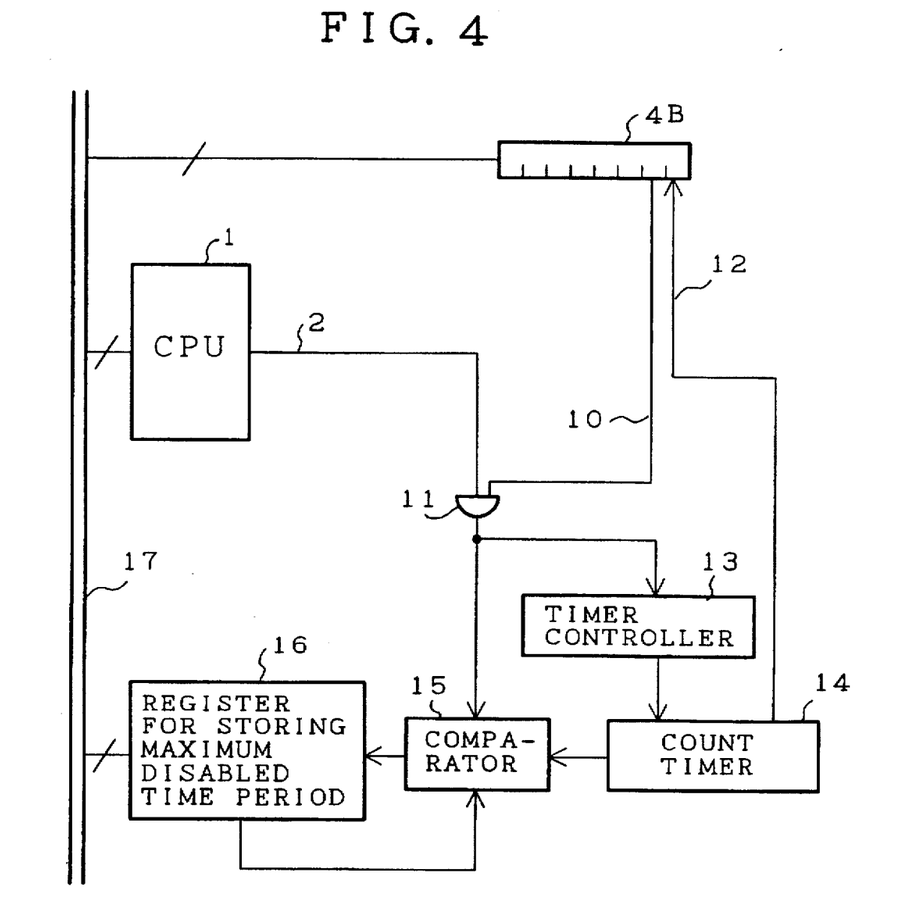
FIG. 4 is a block diagram showing main components of a microcomputer with a function of measuring a maximum of periods of time during which interrupts are disabled, according to a second embodiment of the present invention.

Referring now to FIG. 4, it illustrates a block diagram showing main components of a microcomputer with a function of measuring a maximum of periods of time during which interrupts are disabled, according to a second embodiment of the present invention. In the figure, reference numeral 1 denotes a CPU, 2 denotes an interrupt disable flag signal indicating the state of an interrupt disable flag which can be set to disable interrupts, 4B denotes a measurement control register in which a measurement start flag and a timer overflow flag can be set respectively. 11 denotes an AND gate which allows the interrupt disable flag signal 2 to pass through the AND gate if a measurement start flag signal 10 indicating the state of the measurement start flag in the register 4B is active, 12 denotes a timer overflow signal which can set the timer overflow flag in the register 4B, 13 denotes a timer controller for controlling a count timer 14 for measuring a period of time during which interrupts are disabled, 15 denotes a comparator which compares a count value by the count timer 14 to the contents of a register 16 for storing a maximum of interrupt-disabled time periods measured, and 17 denotes a buss in the microcomputer. In this embodiment, a section for measuring the length of a time period during which interrupts are disabled according to an interrupt disable level is omitted compared to the microcomputer of the first embodiment.

Figure 5:
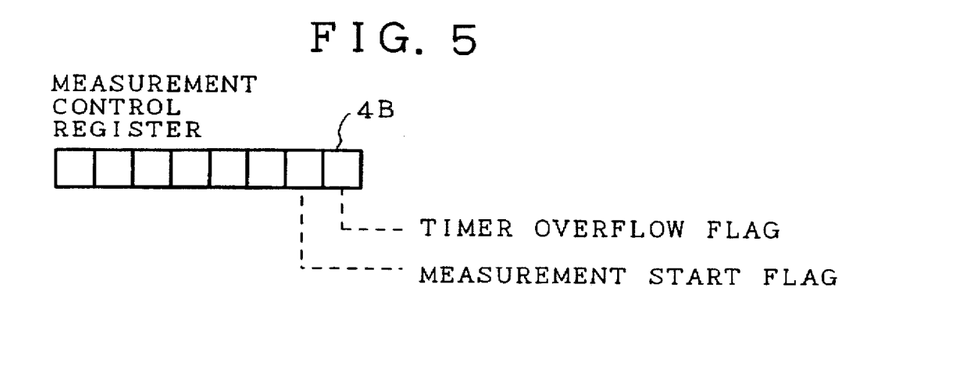
FIG. 5 is a view showing an example of a register used for measurement control, according to the second embodiment of the present invention.

Referring now to FIG. 5, it illustrates an example of the measurement control register 4B. As shown in the figure, the measurement control register 4B includes the measurement start and timer overflow flags.

Figure 6:
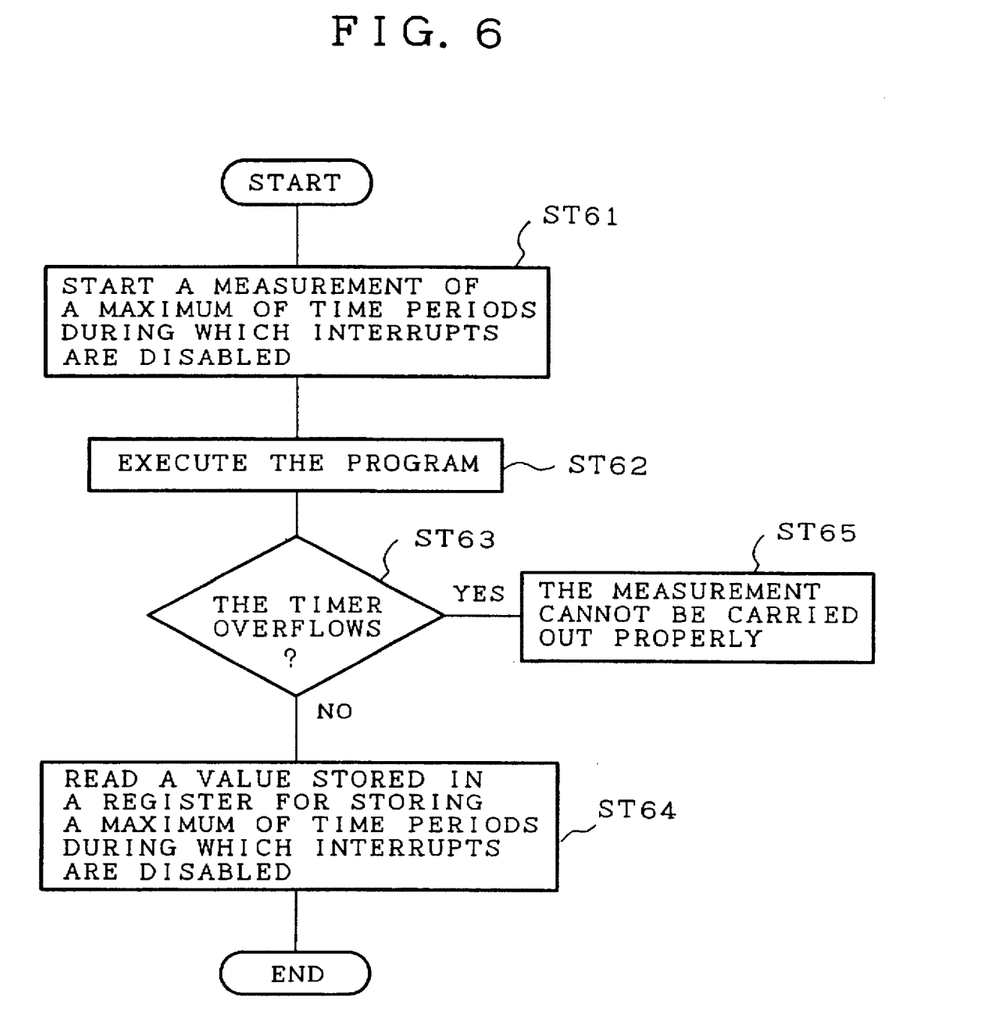
FIG. 6 is a flow diagram showing a process of measuring the maximum of periods of time during which interrupts are disabled, according to the second embodiment of the present invention.

Next, a description will be made as to the operation of the microcomputer according to this embodiment by referring to a flowchart in FIG. 6. The microcomputer according to this embodiment is adapted to be able to handle a plurality of interrupts. Furthermore, the microcomputer has at least an interrupt disable instruction for disabling all interrupts which can be disabled and an interrupt enable instruction for cancelling the interrupt disable instruction. The user which intends to measure a period of time during which interrupts are disabled, in step ST61, sets the measurement start flag in the measurement control register 4B through an emulator apparatus or the like, and after that starts a program in step ST62.

When the interrupt disable instruction is carried out during the program's execution, the CPU 1 sets the interrupt disable flag. As a result, the interrupt disable flag signal 2 makes a transition from its nonactive state to its active state. In this embodiment, the interrupt disable flag signal 2 makes a LOW to High transition. The active interrupt disable flag signal 2 passes through the AND gate 11 because the measurement start flag signal 10 remains asserted. Thus, an active signal appears on the output of the AND gate 11. When the output of the AND gate 11 makes to a transition from its nonactive state to its active state, the timer controller 13 resets the count timer 14 for measuring a period of time during which a certain interrupt is disabled. Then, the count timer 14 starts a counting operation from its initial value.

When the interrupt enable instruction is carried out during the program's execution, the CPU 1 resets the interrupt disable flag. As a result, the interrupt disable flag signal 2 makes a transition from its active state to its nonactive state. In this embodiment, the interrupt disable flag signal 2 makes a HIGH to LOW transition. Thus, a nonactive signal appears on the output of the AND gate 11. When the output of the AND gate 11 makes to a transition from its active state to its nonactive state, the timer controller 13 stops the count timer 14.

The comparator 15 reads a current count value of the count timer 14 and a value stored in the register 16 for storing a maximum of interrupt-disabled time periods when the output of the AND gate 11 makes to a transition from its active state to its nonactive state. Then, the comparator 15 compares them to each other. If the current count value of the count timer 14 is larger than the value stored in the register 16, the comparator stores the current count value into the revisor 16. When a overflow occurs in the count timer 14 carrying out a counting operation, the count timer 14 sets the overflow flag in the measurement control register 4B.

After the program has continued to run for some time, or it reaches a desired address, the user stops the program.

Then, the user reads the contents of the measurement control register 4B through the emulator apparatus or the like. When the overflow flag is set in the measurement control register 4B, this shows that one or more overflows have occurred in the count timer 14 during the program's execution. Therefore, since one or more overflows in the count timer 14 mean that a precise count value could not be obtained, the user, in step ST63, recognizes that the count timer 14 has overflowed and after that determines that a precise measurement could not be carried out to obtain the maximum interrupt-disabled time period, in step ST65. However, the user can recognize that there exists at least a long interrupt-disabled time period which exceeds a maximum countable value of the count timer 14 even though the user cannot know the maximum interrupt-disabled time period.

On the other hand, when the user, in step ST63, recognizes that the count timer 14 has not overflowed, he or she, in step ST64, reads the contents of the register 16 for storing a maximum of interrupt-disabled time periods through the emulator apparatus or the like. The comparator 15 has already stored a count value corresponding to the maximum interrupt-disabled time period obtained during the program's execution into the register 16. Thus, the user can know the maximum interrupt-disabled time period from the value stored in the register 16 immediately.

As previously mentioned, the present invention offers the following advantages.

In accordance with a preferred embodiment of the present invention, a microcomputer is adapted to start a counting operation when a disabled state in which interrupts are disabled starts, and, when a count value at the completion of the disabled state is larger than a maximum of count values previously obtained which is stored in a register for storing a maximum interrupt-disabled time period, store the count value in the register. Therefore, an advantage is that the user can know a maximum of periods of time during which interrupts are disabled for a program without having to recognize all paths in the program, each including a step wherein interrupts are disabled and a step wherein interrupts are enabled. Another advantage is that measurements of periods of time during which interrupts are disabled can be carried out properly because a running time of a program during the measurements of interrupt-disabled time periods is not different from a running time of the program in a real running environment.

In accordance with a preferred embodiment of the present invention, a microcomputer is adapted to detect a start of a disabled state in which interrupts are disabled through detection of a transition of an interrupt disable flag in a CPU to a state indicating that interrupts are disabled, and detect an end of the disabled state through detection of a transition of the interrupt disable flag to a state indicating that interrupts are enabled. Therefore, the embodiment provides an advantage in that a maximum of interrupt-disabled time periods in an arbitrary part of a program can be determined easily.

In accordance with a preferred embodiment of the present invention, a microcomputer is adapted to determine whether or not an interrupt disable level in a CPU defining interrupt priorities of interrupts which are to be disabled is equal to or larger than a predetermined value. Furthermore, the microcomputer detects a start of a disabled state in which interrupts are disabled from a fact that the interrupt disable level is equal to or larger than the predetermined value, and detects an end of the disabled state from a fact that the interrupt disable level is smaller than the predetermined value. Therefore, the embodiment provides an advantage in that a period of time during which a certain interrupt with an arbitrary interrupt priority or lower is disabled can be measured.

In accordance with a preferred embodiment of the present invention, a count timer of a microcomputer is adapted to, when an overflow of a count value occurs during a counting operation, inform the occurrence of the overflow. Therefore, the embodiment provides an advantage in that the user can recognize that there exists at least a long interrupt-disabled time period which exceeds a maximum countable value of the count timer.

In accordance with a preferred embodiment of the present invention, a microcomputer is adapted to have a measurement start flag which is set to allow a timer controller to detect times when a disabled state in which interrupts are disabled starts and ends. Therefore, the embodiment provides an advantage in that measurements of interrupt-disabled time periods can be turned on and off and hence the testing flexibility of a program using an emulator apparatus or the like can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer having a function of measuring a maximum of periods of time during which interrupts are disabled, said microcomputer comprising:

a memory means for storing a value indicating a maximum interrupt-disabled time period in a program;

a disabled-state detecting means for detecting a time when a disabled state in which interrupts are disabled starts in the program and a time when the disabled state ends;

a counter means for starting a counting operation when said disabled-state detecting means detects a time when the disabled state starts; and a comparing means for receiving a count value of said counter means when said disabled-state detecting means detects a time when the disabled state ends, and for updating contents of said memory means by replacing the value in said memory means with the count value when said comparing means determines that the count value is larger than the value in said memory means.

2. The microcomputer according to claim 1, wherein said disabled-state detecting means comprises an interrupt disable flag detecting means for detecting a state of an interrupt disable flag in a CPU which is set to disable interrupts, and wherein said disabled-state detecting means detects a start of a disabled state in which interrupts are disabled through detection of a transition of the interrupt disable flag to a state indicating that interrupts are disabled by said interrupt disable flag detecting means, and detects an end of the disabled state through detection of a transition of the interrupt disable flag to a state indicating that interrupts are enabled by said interrupt disable flag detecting means.

3. The microcomputer according to claim 1, wherein said disabled-state detecting means comprises an interrupt disable level determining means for determining whether or not an interrupt disable level in a CPU defining interrupt priorities of interrupts which are to be disabled is equal to or larger than a predetermined value, and wherein said disabled-state detecting means detects a start of a disabled state in which interrupts are disabled from a fact that an interrupt disable flag detecting means determines that the interrupt disable level is equal to or larger than the predetermined value, and detects an end of the disabled state from a fact that said interrupt disable flag detecting means determines that the interrupt disable level is smaller than the predetermined value.

4. The microcomputer according to claim 2, wherein said disabled-state detecting means comprises an interrupt disable level determining means for determining whether or not an interrupt disable level in a CPU defining interrupt priorities of interrupts which are to be disabled is equal to or larger than a predetermined value, and wherein said disabled-state detecting means detects a start of a disabled state in which interrupts are disabled from a fact that said interrupt disable flag detecting means determines that the interrupt disable level is equal to or larger than the predetermined value, and detects an end of the disabled state from a fact that said interrupt disable flag detecting means determines that the interrupt disable level is smaller than the predetermined value.

5. The microcomputer according to claim 1, wherein said counter means includes a means for, when an overflow of a count value occurs during a counting operation, informing the occurrence of the overflow.

6. The microcomputer according to claim 1, wherein said microcomputer has a measurement start flag which is set to allow said disabled-state detecting means to detect times when a disabled state in which interrupts are disabled starts and ends.

* * * * *